F. CHANTRELL.

ADJUSTABLE SOCKET WRENCH.

No. 10,145. Reissued July 4, 1882.

WITNESSES

E. L. Nottingham,

Geo. W. Seymour

INVENTOR

Felix Chantrell

By H. A. Seymour,

Attorney

N. PETERS, Photo-Lithographer, Washington, D. C.

UNITED STATES PATENT OFFICE.

FELIX CHANTRELL, OF BRIDGEPORT, CONNECTICUT.

ADJUSTABLE SOCKET-WRENCH.

SPECIFICATION forming part of Reissued Letters Patent No. 10,145, dated July 4, 1882.

Original No. 254,275, dated February 28, 1882. Application for reissue filed May 29, 1882.

*To all whom it may concern:*

Be it known that I, FELIX CHANTRELL, of Bridgeport, in the county of Fairfield and State of Connecticut, have invented a new and useful Improvement in Adjustable Socket-Wrenches, of which the following is a specification.

My invention relates to an improvement in adjustable socket-wrenches. Heretofore straight or monkey wrenches have been constructed of two arms, one being U-shaped to receive the other arm, the outer ends of said arms being pivoted or hinged together for opening and closing. The head of the wrench was provided with a right-and-left-hand screw and thumb-wheel for opening and closing the wrench.

My invention relates to wrenches having an adjustable socket, the wrench being rotated on a line extending through the longitudinal axis of the socket, the object being to dispense with the hinges or pivoted connection between the two arms of the wrench and secure the two arms together in a rigid manner, and thus insure spring-arms having a tendency to close, while between the two halves of the wrench-stock are inserted a right-and-left-hand screw and thumb-wheel for adjusting the size of the socket as desired.

With this end in view my invention consists in certain features of construction and combination of parts, as will hereinafter be described, and pointed out in the claims.

Figure 1:
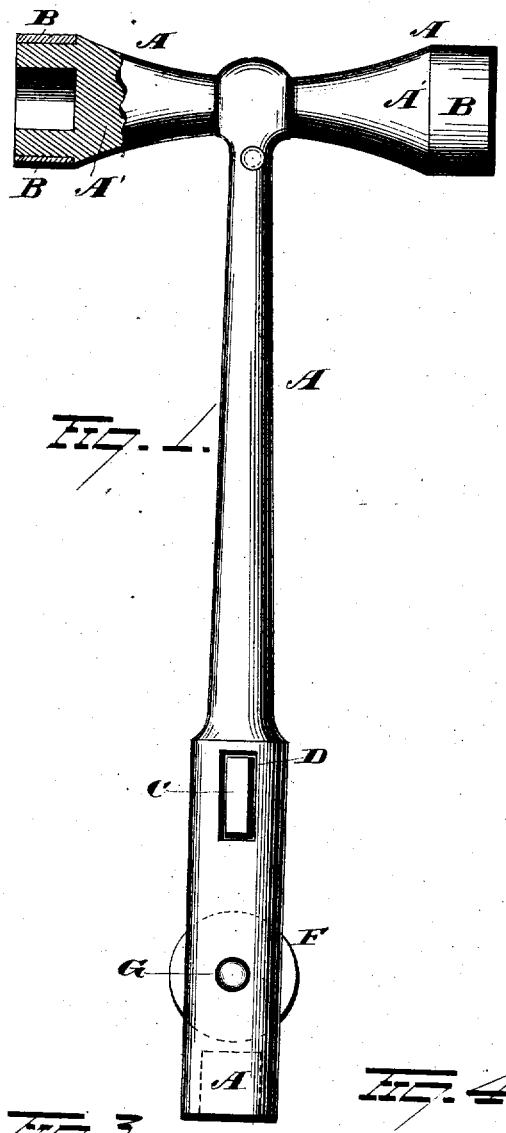
Figure 2:
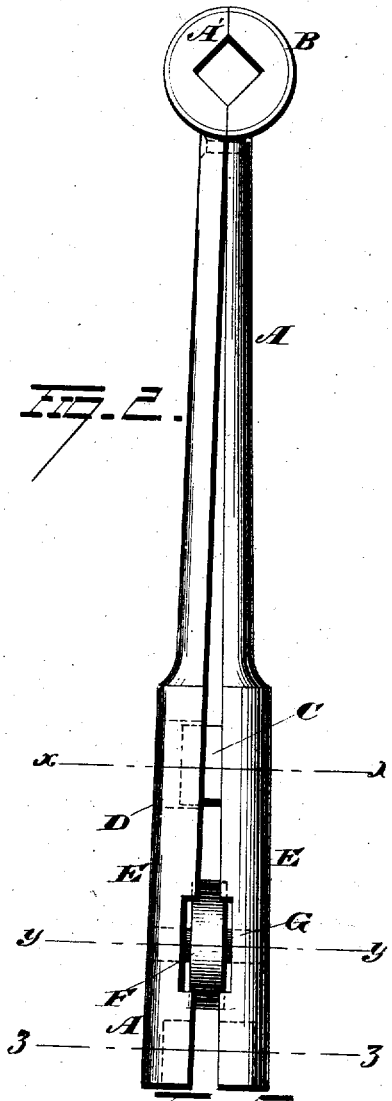
Figure 3:
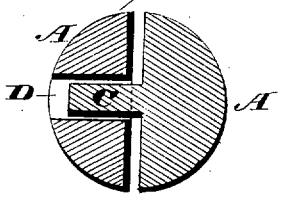
Figure 4:
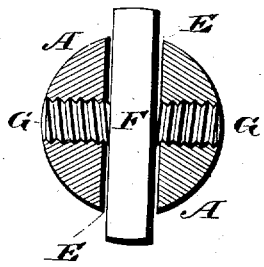
Figure 5:
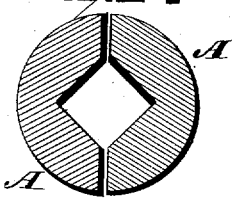

In the accompanying drawings, Figure 1 is a side view of my improvement, partly in section. Fig. 2 is a view of the same turned one-quarter around. Fig. 3 is a cross-section of the same taken through the line *x x*, Fig. 2. Fig. 4 is a cross-section of the same taken through the line *y y*, Fig. 2. Fig. 5 is a cross-section of the same taken through the line *z z*, Fig. 2.

In the form of wrench illustrated in the drawings the stock A is made of metal in T form and has sockets in the ends of its three arms. The socket A is made in two parts, the plane of division passing through the three arms, as shown in Fig. 2, and the two parts are rigidly secured to each other at or near the intersection of the three arms by rivets and by the steel bands B, shrunk upon the ends of the short arms A′, as shown in Figs. 1 and 2. The two halves of the arm A are made broadest in the direction which is parallel to the line of their division, and by being permanently secured at their ends farthest from the divided and adjustable socket constitute spring-arms having a constant tendency to close.

Upon the inner side of one part of the long arm of the wrench A is formed a projection, C, which is made of such a breadth and thickness as will give it the necessary strength to resist the torsional strain upon the parts of the wrench A when the said wrench is being used. The projection C passes through and fits into a slot or mortise, D, formed in the other part of the said long arm of the wrench, as shown in Figs. 1, 2, and 3.

In the adjacent faces of the parts of the long arm of the wrench A, at a little distance from their lower ends, are formed recesses E to receive the thumb-wheel F, which is made of such a size that it will project upon both sides of the said arm sufficiently to allow it to be turned by the thumb and fingers, as shown in Figs. 1 and 4.

G is a screw which passes through a hole in the center of the thumb-wheel F, and is secured at its center to the said wheel, so that the said screw will be turned by turning the said wheel F. The screw G has a right-hand thread upon one end and a left-hand thread upon the other end to fit into screw-holes in the parts of the long arms of the wrench A, so that the said parts will be spread apart to enlarge the socket in the end of the said long arm by turning the thumb-wheel F in one direction, and will be drawn together to contract the said socket by turning the said thumb-wheel F in the other direction. With this construction the screw G assists the projection C in supporting the parts of the long arm of the wrench against the torsional strain when the wrench is being used. In this form of wrench the arms, being permanently secured to each other at one end, must be comparatively thin in one direction to insure sufficient spring or elasticity for opening and closing and of greater width in the opposite direction to withstand the torsional strains.

The stock must be of sufficient size to enable the socket to be formed in its end, and hence quite a large-sized thumb-wheel is required, which insures proper leverage for readily opening and closing the socket. Recesses E in the inner faces of the arms receive the sides of the thumb-wheel and enable the socket to be completely closed, while but a slight portion of the periphery of the thumb-wheel projects beyond the opposite faces of the stock.

Having fully described my invention, what I claim as new, and desire to secure by Letters Patent, is—

1. The spring-arms A, rigidly fastened together at one end and constructed with a divided socket in their opposite ends, in combination with a right-and-left-hand screw and a thumb-wheel for adjusting the socket, substantially as and for the purpose set forth.

2. In a socket-wrench, the combination, with two arms rigidly secured together at one end and provided with an enlarged stock at their opposite ends, having a divided socket formed therein, said arms being made broadest in a line at right angles to their line of opening and closing, of a right-and-left-hand screw and a thumb-wheel for opening and closing the divided socket, substantially as and for the purpose set forth.

3. The combination, with the spring-arms A, rigidly secured together at one end, and constructed with a stock provided with a divided socket and with recesses E E, of the right-and-left-hand screw G and thumb wheel F, substantially as and for the purpose set forth.

4. The combination, with the arms A, rigidly secured together at one end and provided with a divided socket at their opposite ends, a slot or mortise in one arm, and a projection, C, in the inner face of the other arm, of a right-and-left-hand screw and a thumb-wheel located between the two sections of the divided stock, substantially as and for the purpose set forth.

5. An adjustable socket-wrench consisting of two long arms rigidly secured together at one end and provided with a divided socket in their opposite ends, a right-and-left-hand screw and thumb-wheel for adjusting the socket, and two short arms formed integral with the fixed ends of the long arms and arranged at right angles thereto, substantially as and for the purpose set forth.

6. An adjustable socket-wrench consisting of two long arms rigidly secured together at one end and provided with a divided socket in their opposite ends, a right-and-left-hand screw and thumb-wheel for adjusting the socket, and two short arms formed integral with the fixed ends of the long arms and arranged at right angles thereto, the outer ends of said short arm being provided with sockets, substantially as and for the purpose set forth.

7. The three-armed T-wrench A, divided on a plane passing through its three arms and their end sockets, and having its sections held together by the socket-bands B B on the short arms and intermediate rivet through the long arm and near the end of long arm by reversely-threaded screws on wheel F and correspondingly-threaded sockets in the opposite sections of long arm, as shown and described.

FELIX CHANTRELL.

Witnesses:

CHAS. P. HAZELTINE,

J. E. CRANE.